Dec. 16, 1952 C. W. GEER 2,622,220

TELEVISION COLOR SCREEN

Filed March 22, 1949 2 SHEETS—SHEET 1

INVENTOR:
CHARLES WILLARD GEER
BY HIS ATTORNEYS
HARRIS, KIECH, FOSTER & HARRIS
By

INVENTOR:
CHARLES WILLARD GEER
BY HIS ATTORNEYS
HARRIS, KIECH, FOSTER & HARRIS
By [signature]

Patented Dec. 16, 1952

2,622,220

UNITED STATES PATENT OFFICE 2,622,220

TELEVISION COLOR SCREEN

Charles Willard Geer, Long Beach, Calif., assignor to Technicolor Motion Picture Corporation, a corporation of Maine Application March 22, 1949, Serial No. 82,794

16 Claims. (Cl. 313—92)

This invention relates to television apparatus, and more particularly to screens adapted to yield color effects in receiving sets.

A principal object of the invention is to provide a screen with which color effects may be accurately rendered so that clear color images may be seen by the beholder.

Another important object of the invention is to produce a color screen structure by means of which electron beams which tend to overshoot respective pyramidal faces of one form of screen construction, and undesirably strike other faces which should not be reached, may be adsorbed or otherwise prevented from becoming effective.

According to the mentioned form of television color screen, which is disclosed and claimed in my copending application, Serial No. 544,384, filed July 11, 1944, issued as Patent No. 2,480,848, a multiplicity of trihedral pyramids of small sizes below the resolving power of the eye is used as the effective screen surface, and the faces of the trihedrons are arranged in repeating geometrical patterns with corresponding faces facing in the same direction, the three series of faces of the trihedrons facing regularly in different directions, the faces of each series facing in a given direction being coated with a given phosphor which, when energized by the respective electron beams, is activated to luminescence to yield a given color, which may be one of the primary colors or other principal color as desired. Instead of three series of faces, other series such as two or four may be employed. These series of faces, being coated with phosphors yielding corresponding principal colors when activated, thus give natural color effects to the observer's eye. Such a television screen is disposed within a cathode ray tube or a bulb, often known as a "kinescope," and this bulb is provided with an electron gun for each series of faces, the respective gun being disposed to direct corresponding electron beams toward the respective phosphor-coated trihedral faces so that the beams will impinge upon the faces as nearly perpendicularly thereto as possible. These electron guns are controlled by respective signals originating in known transmitting apparatus employed. However, as the beams from the respective guns move while conventionally scanning the screen, their angle of impingement upon the respective faces constantly varies with respect to the general plane of the screen, both as the respective beam is moved from side to side of the screen and as it is moved from top to bottom of the screen. As a consequence, beams desired to fall only upon a given series of faces overshoot their respective target faces at various parts of the screen and fall obliquely upon portions of contiguous phosphor-coated faces which are intended to be energized only by electron beams from one of the other guns. Such overshooting or overlapping of electron beams tends correspondingly to activate the phosphors of other faces at undesired intervals and results in corresponding confusion of the image to the extent that a perfectly clear image is not realized.

I have found that the above indicated objection due to overshooting or overlapping of electron beams and the corresponding undesired energizing of other phosphors is highly objectionable for commercial application, and it is, therefore, an important object of this invention to provide a novel television color screen structure which will avoid the difficulty described. Otherwise stated, it is an object of this invention to present a form of construction for television color screens such that clear and accurate images in natural colors may be produced during scanning by television receivers where a plurality of electron guns is employed to project electron beams representative of the three primary colors or other principal colors.

An incidental object of the invention is to provide a modified television bulb or kinescope provided with a plurality of electron guns of the indicated type and containing a television color screen upon which clear color images will be produced and by which undesired effects of overshooting or overlapping of electron beams upon other phosphor-coated surfaces will be substantially or entirely eliminated.

Other objects, together with the various features of the present invention, will become apparent to those skilled in the art upon reference to the accompanying drawings and the following specification wherein certain embodiments of the invention are disclosed by way of exemplification.

Figures 1, 2, 3, 4, 5, 6, 7:
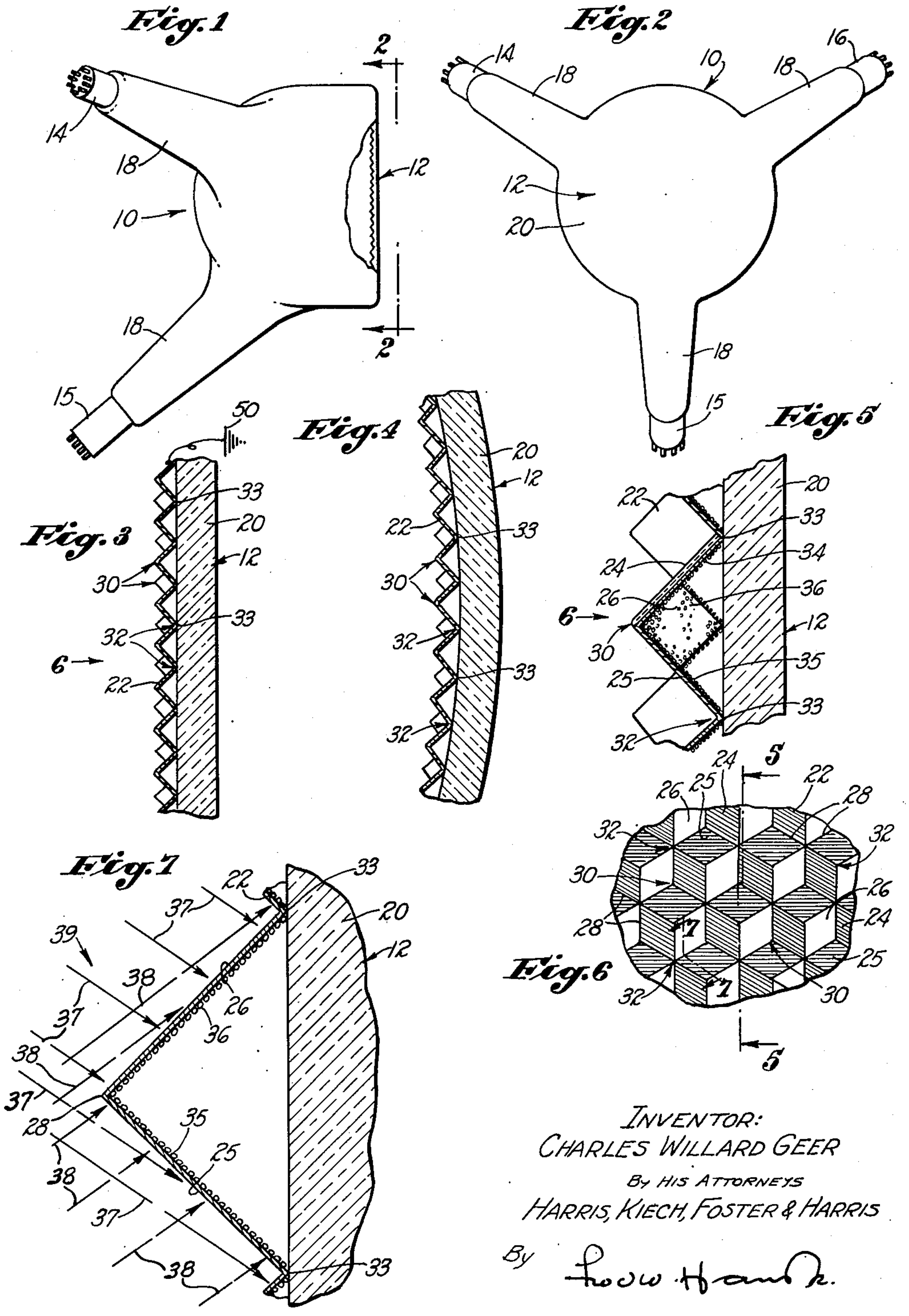
Fig. 1 is a side elevation of a television bulb of the kinescope or iconoscope type within which an improved color screen of the present invention is located, a portion of the bulb being broken away to indicate the screen positioning and mounting.
Fig. 2 is a front elevation of the bulb of Fig. 1 as indicated by the line 2—2 of Fig. 1.
Fig. 3 is a fragmentary cross section on an enlarged scale of the screen seen at the right of Fig. 1, the screen in this form being indicated as of flat construction.
Fig. 4 is a view similar to that of Fig. 3 indicating a screen of slightly concave configuration.
Fig. 5 is a fragmentary, somewhat diagrammatic, cross section similar to those of Figs. 3 and 4 and on a still larger scale showing the location of the phosphors on the screen, this view being indicated further by the line 5—5 of Fig. 6.
Fig. 6 is an elevational view of the inner face of the screen as indicated by the arrows 6 of Figs. 3 and 5, this elevation being on an intermediate scale.
Fig. 7 is a diagrammatic sectional view as indicated by the line 7—7 of Fig. 6, the showing being on a greatly enlarged scale in order to illustrate the general nature of the impingement of electron beams upon two adjacent surfaces of one of the pyramidal elements of the impinging surface of the screen.
Figures 8, 9, 19:
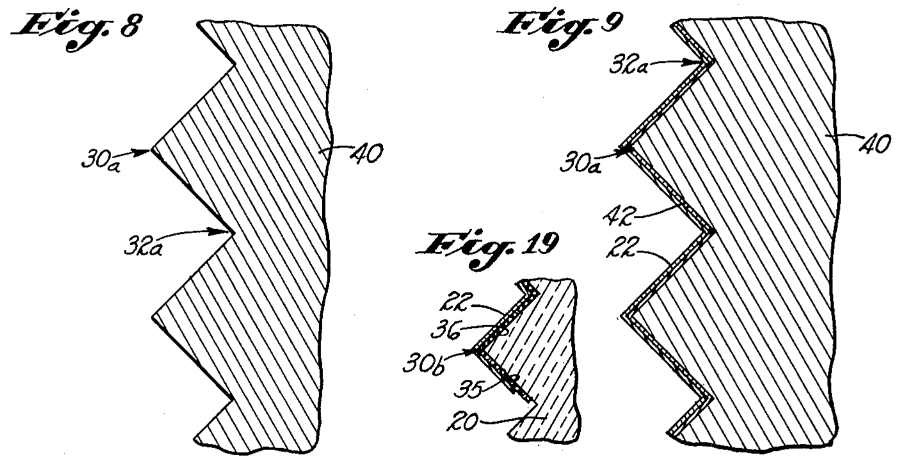
Figures 10, 11, 12, 13, 14:
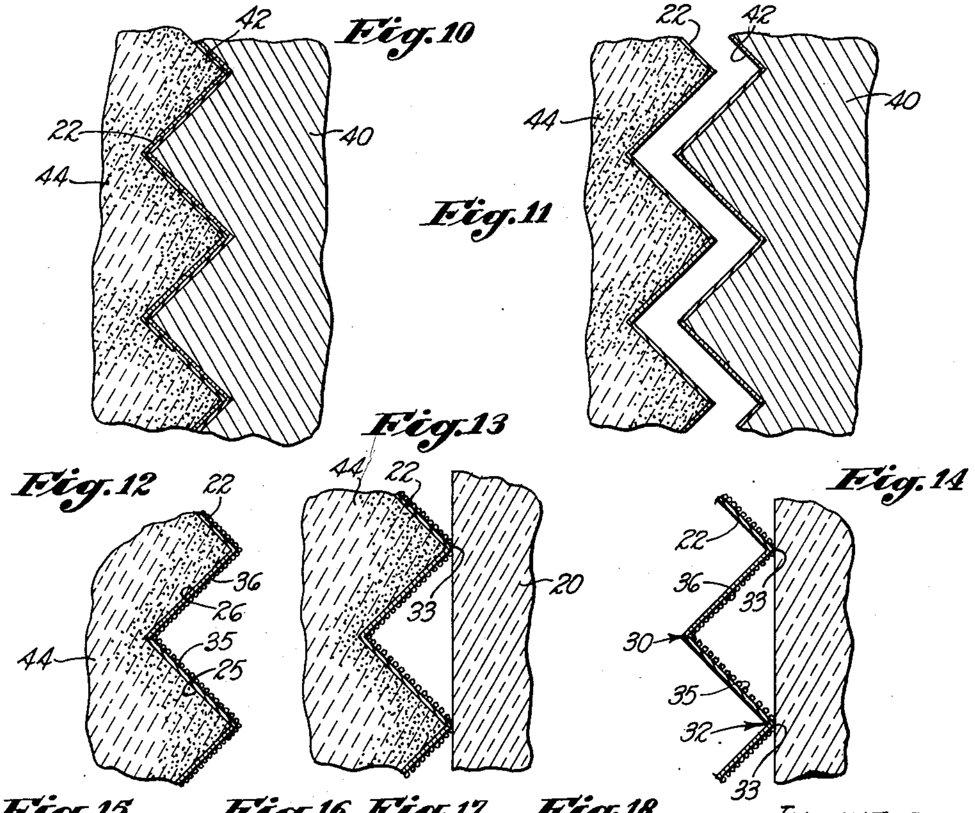
Figures 15, 16, 17, 18:
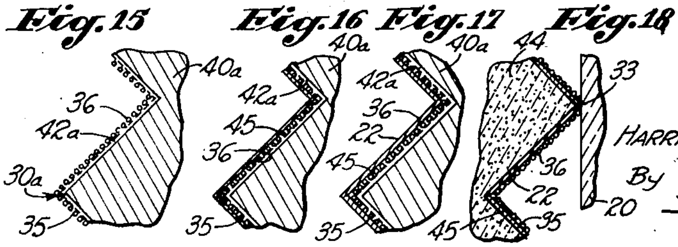

Fig. 8 is the first of a series of figures illustrating the method of producing the screen of Figs. 1 to 7, and is a fragmentary cross section, on an enlarged scale similar to the scale of Fig. 5, of a die or mold, at a single plane only, of any appropriate material whose face has been carefully engraved or otherwise shaped to produce the necessary pyramidal configuration, such as that shown by Fig. 6;

Fig. 9 indicates the application to the die of Fig. 8 of an anti-sticking material upon which there is deposited, by any appropriate evaporation or other method, a continuous layer of appropriate thickness of aluminum or similar material suitable for the purpose;

Fig. 10 illustrates the application of a stiff backing of wax or other appropriate material to the aluminum facing on the die;

Fig. 11 indicates the step of removing the wax or other backing, together with the aluminum layer which has adhered thereto, from the die and the applied layer of anti-sticking substance;

Fig. 12 illustrates the next steps of depositing, as by settling, different phosphors upon the respective series of faces of the aluminum pyramidal structures held by the wax backing;

Fig. 13 indicates a succeeding step of affixing the phosphor-coated aluminum screen, while attached to the wax backing to a glass or other appropriate screen base constituting a transparent or translucent viewing face of the screen and, as in the form shown in Figs. 1 and 2, also constituting the front wall of the television bulb;

Fig. 14 indicates the completed screen following removal of the wax or other backing by melting, volatilization or other appropriate process, the screen being now ready for incorporation into the television bulb and subsequent evacuation of the bulb;

Fig. 15, which corresponds in general with Fig. 9, is the first of a series of figures indicating another method of producing the screen wherein an anti-sticking layer of material may be first applied to the die or mold if required, the various phosphors being then settled or otherwise deposited upon the respective faces of the die or mold;

Fig. 16 represents the application of a layer of appropriate material to the deposited layers of phosphors to provide a smooth surface over the phosphors;

Fig. 17 illustrates the application of a layer of aluminum or other appropriate screen material by appropriate deposition on the coated layers of phosphors;

Fig. 18 indicates the removal of the aluminum pyramidal screen with the phosphors from the die by the wax backing and illustrates the mounting of the aluminum screen with its phosphors upon the translucent base constituting the front wall of the screen structure; and Fig. 19 indicates another modification.

Having reference to the drawings, Fig. 1 illustrates an evacuated glass cathode ray tube bulb 10 of the iconoscope of kinescope type having at its front a viewing screen structure 12, its opposite end being provided with a plurality of electron guns 14, 15 and 16 mounted upon a corresponding number of carrying necks 18 which are integral with the bulb 10 and are arranged at appropriate angles to direct electron beams upon the receiving face of the screen structure 12. Preferably, the electron guns and their supporting necks 18 are symmetrically disposed about an axis which extends centrally through the screen structure 12 whereby to cause impingement of the respective electron beams upon pyramidal faces symmetrically arranged in repeating geometrical patterns and constituting the receiving face of the screen structure 12. The electron guns 14, 15 and 16, being three in number, are adapted for use with trihedral pyramidal screen elements, and will, therefore, be employed to produce the phenomenon of cathodo-luminescence upon three different phosphors to yield different luminescences corresponding with three selected, principal colors and capable of being produced by the respective phosphors when activated so that they will luminesce. Such colors may be primary colors; preferably they will be red, blue and green. With proper selection of the phosphors, as understood in the art, the natural colors of the subject may be admirably simulated.

As to manipulation of the electron guns 14, 15 and 16 to scan the screen structure 12, this will be controlled by means well understood in the television art. Similarly, the employment of analyzing equipment to segregate and present color signals in proper frequencies to the respective electron guns in correspondence with the natural colors of the image being televised is likewise known in the art. Therefore, explanation and description of such aspects, which are no part of the present invention, are not presented here.

The television color screen of this invention is illustrated in Figs. 3 to 7, and methods for its construction are indicated in Figs. 8 to 19. Having reference to Figs. 3 to 7, the screen structure 12 comprises an appropriate screen base 20 of suitable transparent or translucent material, as may be required, which may be in the form of glass constituting one wall of the bulb 10, or may be of appropriate plastic material, or otherwise as deemed the most efficient or desirable. The receiving screen for the electron beams is a thin electron-penetrable screen 22 formed with a multiplicity of repeating geometrical patterns presenting different faces at differing angles for impingement thereupon of the electron beams from the respective electron guns 14, 15 and 16. These repeating patterns have sizes below the resolving power of the eye at normal viewing distance, and, according to a preferred form, are minute trihedrons in which the three intersecting faces of each trihedral pyramid are arranged at appropriate angles, such as, for example, angles of 40° to 50° to the surface of the screen base 20, so that the lines of intersection of the trihedron faces may meet one another at the respective apexes at angles approximating 90°. However, such angularity is not critical, and the trihedrons, therefore, may be shorter or taller as required, but probably taller in most instances where variation from the indicated angularity is desired.

As best appears in Figs. 5 and 6, the three faces of each trihedron are respectively indicated at 24, 25 and 26, and for the purpose of this description the faces 24 represent those receiving phosphors responding to red coloring, the faces 25 representing those receiving phosphors to yield blue luminescence, and the faces 26 receiving phosphors to yield green luminescence. The mentioned ridges formed by intersection of adjacent trihedral faces are indicated at 28 in Figs. 6 and 7. The trihedral apexes of the screen are indicated at 30 and the trihedral depressions are indicated at 32 as viewed from the side of the screen 22 upon which electron beams impinge. However, as viewed from the front of the screen structure, that is from the outer face of the glass or other screen base 20, the relationship is reversed.

The described screen 22 is attached to the translucent or transparent base 20 at appropriate intervals such as indicated at 33 in some of the figures, the attachment being such that necessary evacuation of the bulb 10 during manufacture may be readily effected. From the standpoint of construction of the present screen, the screen base 20 is substantially planar and may be either flat as illustrated in Figs. 1 and 3, or somewhat concave as illustrated in Fig. 4.

In conformity with the principal features of this invention, the phosphors employed on the screen 22 are mounted upon the outer face, or front face, of the screen 22 and opposite from the face of the screen upon which the electron beams impinge after projection from the electron guns 14, 15 and 16. As best indicated in Fig. 5, phosphors 34 representing red are deposited upon the fronts of the trihedral faces 24, phosphors 35 representing blue are deposited upon the fronts of the trihedral faces 25, and phosphors 36 representing green are deposited upon the fronts of the trihedral faces 26. The described location of the phosphors is such that they are activated only by electron beams which have directly penetrated and passed through the respective trihedral faces 24, 25 and 26 of the screen 22.

The reason for locating the phosphors upon the trihedral faces of the screen 22 opposite from the face upon which the electron beams impinge is that the screen may be made of a material, such as aluminum or other appropriate material, which may be opaque to visible light rays, and will be opaque to the electron beams beyond a readily determinable thickness under a given voltage. Also, by employing higher voltages to cause penetration of the screen by the electron beams where such determined thickness is used, greater brilliance in the image is attained. As an example, a voltage in the order of 9000 to 10,000 volts will cause electron penetration of an aluminum screen having an optimum thickness approximating 0.0001 to 0.0002 millimeter, or 0.0001 to 0.0005 mm. where using a voltage in the range of 15,000 to 20,000 volts. These are published data available on pages 293 to 295 of the book entitled "Television, volume 4, 1942–1946," published January, 1947, by RCA Laboratories Division of Radio Corporation of America. This publication shows that an aluminum film of 0.0001 mm. (1,000 Angstroms) passes about 77% of a 10,000-volt beam, and an aluminum film of 0.0002 mm. in thickness, (2,000 Angstroms) passes about 57% of a 10,000-volt beam. The chart accompanying the article indicates that, in using a 20,000-volt beam, something over 70% of the beam is passed by an aluminum film of 5,000 Angstroms (0.0005 mm.), something over 85% is passed by an aluminum film of 2,000 Angstroms, and something over 90% is passed by an aluminum film of 1,000 Angstroms in thickness. Since an aluminum film of only 500 Angstroms (0.00005 mm.) begins to pass visible light rays, it is apparent that a usable aluminum film must have a thickness of about 1,000 Angstroms. In employing the higher voltages indicated not only is the desirable greater brilliance obtained upon the screen, but the employment of such a material for the screen, wherein the phosphors are placed upon the observer's side, provides for the absorption of electron beams which, during scanning, overshoot the trihedral faces upon which they are desired to fall and thereby overlap at small angles to other faces upon which their impingement is undesired. This situation is indicated diagrammatically in Fig. 7, in which it is to be appreciated that the overshooting beams would have to penetrate relatively greater thicknesses of the aluminum or other screen material after impinging the screen at the sharp angles indicated. Thus, in Fig. 7, the arrows 37 are employed to represent the electron beams, to be known as beams 37, which properly impinge upon the respective faces 25 and 26, and the two arrows 38 are indicative of the electron beams, to be known as beams 38, which overshoot the respective faces 25 and 26 and strike at sharp angles the other faces lying in each instance just beyond the ridges 28. As a result of the indicated relationship between the various beams and the angularity of the faces 25 and 26, the beams 37 which properly fall upon these faces are required to penetrate approximately only the minimum thickness provided by the aluminum screen 22, whereas the overshooting beams 38, due to the sharp angle of impingement, would have to pass through the aluminum wall for a distance several times the minimum thickness of such wall. In practice, the overshooting beams 38 will be substantially or completely absorbed and will not appreciably pass through to the other side of the aluminum wall. As a consequence, the beams 38 never reach the phosphors 35 and 36 on the opposite or forward side of the faces 25 and 26 in sufficient intensity to substantially activate them, if at all, and the desired result is attained because the beams represented by the arrows 38 never have an opportunity to excite appreciably the phosphors on such opposite or forward sides of the faces 25 and 26. The same, of course, is true of the faces 24 and the respective phosphors 34.

In order that the electron beams which strike upon the inner sides of the trihedral faces 24, 25 and 26, as represented by the arrows 37, after passing through the thin aluminum screen 22, may not continue through the respective phosphor layers and excite other phosphors, the various layers of the phosphors 34, 35 and 36 are made thick enough to absorb substantially all their respective beams. This is important especially when the angularity of the beams represented by the arrows 37 becomes relatively sharp, as roughly indicated by the arrow 39 of Fig. 7, as the scanning operation carries the beam over to the most remote portion of its path. While some of the beam-angle relationships indicated in Fig. 7 are necessarily more or less exaggerated in order to illustrate all of the stated situations in one figure, yet the general relationships can be adequately appreciated.

From the foregoing description it is evident that beams which fall properly upon the trihedral faces of the screen pass directly through the respective, thin portions of the screen and thereupon activate the respective phosphors on the opposite sides of the various trihedral faces. Those electron beams which overshoot the faces toward which they are primarily directed, strike the contiguous faces at sharp angles as indicated by the arrows 38, and, because of such sharp angles, are substantially absorbed by the metal or other materials of the screen 22 before completing such angular path therethrough. Thus, such angularly impinging rays fail to activate appreciably the phosphors which they are not desired to activate. Also, it will be apparent that, by reason of sufficient thickness of the various phosphor layers 34, 35 and 36, those electron beams which pass directly through the trihedral faces of the screen are substantially absorbed by the respective phosphors without opportunity to continue and appreciably activate other phosphors.

Figs. 8 to 19 illustrate methods by which the screen of Figs. 1 to 7 may be produced. Here, a die 40 is diagrammatically indicated whose face is accurately ruled or engraved in exact conformity with the trihedral construction desired in the screen 22. Thus, the required trihedral apexes 30*a* and trihedral depressions 32*a* are formed to correspond with the apexes and depressions 30 and 32 of the screen 22. The face of the die 40, when completed, will, therefore, have the same appearance as that of the screen 22 as seen in Fig. 6, and in view of the nature of its possible employment it may be considered not only as a die but also as a mold or a model. A first step which may be necessary in the production of the screen is, as indicated in Fig. 9, the application to the face of the die 40 of a lubricating or anti-sticking substance 42 in a continuous layer. The second step of the method of forming the screen is the application to the face of the die, upon the lubricant or anti-sticking material if used, of the metal or other material which is to constitute the screen proper. In the case of aluminum which is a preferred material because of its electron-penetrable characteristics, the aluminum may be deposited by any of the known evaporation methods, including those where evaporation takes place in a vacuum as well understood in the art, or otherwise as may seem most desirable. By the indicated method of deposition, the resultant aluminum covering 22 possesses an adequately uniform thickness upon completion of the operation. Such thickness may be in the range previously indicated. The point is that the screen should be thick enough to have sufficient rigidity and at the same time to reflect approximately equally all of the light colors and not to give selective reflection of any particular color predominately. As will be understood, suitable materials other than aluminum may require other screen thicknesses.

Having properly formed the screen 22 upon the die 40 by such means as above described, or otherwise, the next step is to apply a stiff backing 44 to the formed screen 22 carried by the die. Such backing material may be a meltable wax which is rather hard at ordinary temperatures, such as a high melting point paraffin wax, beeswax, or the like, or it may be some other organic material which may be easily flowed into position while molten or otherwise appropriately positioned. Such a backing should be one which may subsequently be readily removed, as by melting it away from the metal screen 22, or by vaporization, or other satisfactory method of removal. Also, it is desirable that the backing material 44 not only have such consistency as to provide adequate stiffening characteristics to maintain the shape of the metal screen 22 while undergoing subsequent operations, but also that it have some selective adhesive qualities so that it will satisfactorily adhere to the formed metal screen 22.

Following application of the backing material 44 as illustrated in Fig. 10, such backing material 44 and the screen 22 adhering thereto are now separated from the die or mold 40 as illustrated in Fig. 11, whereupon the screen 22 is ready for the application of phosphors to its various faces. The next step is illustrated in Fig. 12 and comprises the application of appropriate phosphors to the corresponding trihedral faces. Thus, as seen in Fig. 12 the phosphors 35 and 36 are deposited upon the corresponding pyramidal faces 25 and 26, and similarly phosphors 34 indicated in Fig. 5 are applied to the respective trihedral faces 24. Such depositing of phosphors may be effected through dusting, spraying or settling operations, as is readily understood, each series of trihedral faces being properly positioned to receive the respective phosphors through a corresponding series of operations. Where trihedrons are employed, three different settling or other operations to deposit three different phosphors or phosphor combinations will be required. Similarly, should tetrahedral pyramids be employed instead of trihedrons, as is within the scope of the invention and which would be required for a fourth color, a fourth phosphor-depositing step would be necessary. The layer of phosphors deposited should be thick enough to intercept or absorb substantially all corresponding electron beams which would pass through the thin walls of the metal screen 22 under the voltage to be employed. Such adhesive would be used in connection with the phosphors or upon the screen faces as necessary to build up the required layers of phosphor particles.

Having properly applied the various phosphors, as diagrammatically indicated in Fig. 12, the next step is to attach the metal screen 22 to the glass or other transparent or translucent screen base 20, as represented in Figs. 13 and 18. For this purpose, faces of the screen 22 carrying the phosphors are directed toward the inner face of the screen base 20 and the screen 22 is attached at appropriately spaced locations to the screen base 20 by any appropriate means including marginal clips and suitable bonding material located at some of the apexes opposite the trihedral depressions 32 as diagrammatically indicated at 33. Such spacing of the points of attachment provides for subsequent evacuation after the screen structure has been built into the bulb 10. Following proper attachment of the phosphor-coated screen 22 to the screen base 20, the assembly is then transferred to any suitable apparatus in which the backing material 44 is removed, as previously indicated, which may be by melting, vaporization or otherwise as best adapted to the process or the backing material. Such removal results in the screen structure illustrated in Fig. 14.

It may also, at times, be feasible to remove the screen 20 from the mold 40 without employing the backing material 44, in which case the phosphors may be applied before or after such removal, and the screen then applied to the glass or other base 20.

Figs. 15 to 18 illustrate a modified procedure for building up the phosphor-coated screen 22. According to Fig. 15, the various phosphors, such as indicated at 35 and 36, are applied to the faces of the die or mold 40*a*, an appropriate layer of material 42*a* having been first applied to the faces of the die or mold 40*a* as may be necessary to cause adherence of the phosphors upon their deposit, and at the same time provide for their subsequent lifting with the metal screen 22. Following the application of the phosphors, a suitable electron penetrable filler material 45 is deposited upon the phosphor particles so as to provide a smooth outer surface upon which the aluminum or other metal or other material for the screen 22 may be deposited, as by vaporization heretofore mentioned, and so that the pyramidal faces of the screen 22 may be adequately smooth and even and to insure uniform thickness of the pyramidal screen walls.

Following preparation of the described surface 45 upon the phosphors as illustrated in Fig. 16, and the deposition of the metal or other material of the screen 22 as indicated in Fig. 17, the backing material 44 is then applied to the screen 22 in the same manner as indicated in Fig. 10 and as seen in Fig. 18, whereupon the backing material 44, with the screen 22 adhering thereto, is separated from the die or mold 40*a*. Separation of the screen 22 carries with it the phosphors, as indicated in Fig. 18. The phosphor-coated screen is then attached to the transparent or translucent screen base 20, as indicated in Fig. 18, and in the same manner as described above with respect to Fig. 13, whereupon the backing material 44 is melted or otherwise removed to leave a structure of the same type as illustrated in Fig. 14. The substance 45 used to provide a smooth surface over the phosphors for reception of the material being deposited to produce the screen 22 may be one capable of causing adhesion of the phosphors to the faces of the screen 22 and not necessarily subject to dissipation when the bulb 10 is evacuated.

Here again, the screen 22 with attached phosphors may directly be removed from the die or mold 40*a* without the intermediary of the backing material 44 (especially where the latter is a rigid metal support) and directly transferred to the base 20. The mold 40*a* may also be considered as representative of a wax or similar mold made upon the metal die or mold 40, the phosphors being applied to such wax mold and the screen material being applied over the phosphors and filler material 45 as just described. Subsequently, the wax mold is readily removed by vaporization or melting, whereupon the resultant screen 22 may be applied directly to the screen base 20 to yield a screen structure such as that of Figs. 14 and 18.

Another possible screen structure and method of production are illustrated in Fig. 19, where the translucent screen base 10 is itself appropriately ruled, engraved, or otherwise formed to provide the required ridges or pyramids with apexes 30*b*, phosphors such as phosphors 35 and 36 are deposited on such ridges or pyramids, as in Fig. 15, and the metal screen applied as in Figs. 16 and 17, thus yielding the finished screen product directly.

Phosphors which are appropriately excitable by the electron beams to yield principal colors as above described may be selected from those known to the art, such as those mentioned in the Leverenz patent, 2,310,863, and those mentioned by Zworykin and Morton in their work entitled "Television, the Electronics of Image Transmission," published in 1940 by John Wiley & Sons, Inc.

As has been pointed out above, the employment of the thin, electron-penetrable screen, which is electron-penetrable only within limited thicknesses, and with relatively high voltages to effect such electron-penetration, results in an unusual screen brilliance. In addition, the employment of such a screen overcomes fuzzy images which would otherwise result from the overshooting of the pyramidal faces of one series and consequent undesired excitation of phosphors carried by the faces of an adjacent series. Such correction is attained whether the overshooting be a result of scanning on certain portions of the screen or the result of inherent angular relationships between the electron beams and the various series of faces of the small, pyramidal elements of screen.

It is to be appreciated that while the repeating geometrical pattern on the screen 22 has been principally described as being in the form of trihedrons, nevertheless, other pyramidal arrangements of sub-elemental size, that is, a size below the resolving power of the eye at normal viewing distance, may be employed, such as pyramids presenting tetrahedral angles, as previously mentioned. In such instances, a correspondingly increased number of electron guns and a correspondingly increased number of phosphors to supply the corresponding principal colors, will be required. Also, where two-color images would be acceptable, ridges providing only two faces, whose cross section would be the same as indicated in Fig. 7, would be usable. Again, the screen structure as a whole may be mounted as a unit in a viewable position within the bulb, instead of necessarily constituting an outer viewing wall of the bulb, and the metal screen may then be mounted on either side of the screen base.

In connection with the employment of electron penetrable metal, such as aluminum, to supply the screen 22, the above mentioned brilliancy in the image obtained by employment of the indicated high voltages may be enhanced by providing a ground for the screen 22 such as indicated at 50 in Fig. 3. Such ground, in cooperation with the cathode rays of the electron guns, aids in yielding superior brilliance in the color images created by the various phosphors upon the screen.

Since other variations of the generic invention herein disclosed will become apparent to those skilled in this art, it is intended that the patent claims shall cover all such modifications as fall within their scope, and to that end, it is intended that such claims shall be viewed as broadly as the prior art shall permit.

I claim as my invention:

1. A cathode ray tube particularly adaptable to the production of colored television images, said tube including: a substantially planar translucent sheet; a thin electron-penetrable screen formed in repeating geometrical patterns, each pattern providing at least two sloping sides meeting in an apex, said sides having front and rear surfaces; means for respectively scanning correspondingly-facing sides of said patterns with corresponding electron beams and projecting the respective beams upon the corresponding rear surfaces to enter such surfaces and be transmitted through the thin material of the screen to the corresponding front surfaces; and phosphor layers covering said front surfaces and activatable to luminescence by the transmitted electrons, said screen being secured to said sheet with a portion of each of said phosphor covered front surfaces contacting the sheet.

2. A cathode ray tube as defined in claim 1, in which said electron-penetrable screen is formed of a thin metal.

3. A cathode ray tube as defined in claim 2 wherein said screen is formed of aluminum.

4. A cathode ray tube as defined in claim 1 wherein the dimensions of each pattern are below the resolving power of the human eye at normal viewing distance.

5. A television color screen structure comprising: a substantially planar translucent sheet; a thin electron-penetrable screen attached to said sheet, said screen formed in repeating patterns, each of which patterns comprises a plurality of angularly disposed faces meeting in an apex; and layers of a plurality of different electron-activatable phosphors respectively mounted upon said faces to yield different colors upon selective activation to luminescence and collectively to simulate natural colors.

6. A screen structure as in claim 5 wherein the surface thereof is in the form of a multiplicity of trihedrons.

7. A screen structure as in claim 5 wherein the dimensions of each pattern are below the resolving power of the human eye.

8. A television screen structure comprising: a substantially planar translucent sheet; a thin electron-penetrable screen attached to said sheet and having a plurality of series of angularly disposed meeting faces providing a multiplicity of patterns wherein all faces of the same series face in the same direction and the faces of the different series face in different directions, the resultant multiplicity of meeting points being spaced at minute distances; and different prosphors carried at one side of said thin screen at the respective series of faces, the different phosphors being excitable by respective electron beams to yield different color effects.

9. A television screen structure as in claim 8 wherein said phosphors are carried by said faces of said thin screen.

10. A television screen structure as in claim 8 wherein said phosphors are carried by said sheet on faces corresponding with said screen faces.

11. A television screen structure as in claim 8 wherein said phosphors are carried by said faces on their sides adjacent said sheet.

12. A screen structure as in claim 8 wherein the surface of the screen is in the form of a multiplicity of trihedrons.

13. A television screen structure comprising: a substantially planar translucent sheet; an electron-penetrable screen attached to said sheet, said screen having a multiplicity of meeting faces arranged in a plurality of series, each series of faces being uniformly faced in a different direction from the other series of faces for impingement respectively thereon of electron beams from different sources, each series of screen faces having substantially uniform thickness adapted for passage therethrough of the respective electron beams when falling substantially directly thereon, the lateral extent of each face being sufficient to absorb overshooting electron beams falling thereon at slight angles to their planes; and different materials respectively carried at the sides of the respective series of said faces from which such beams emerge upon passing therethrough, said different materials being adapted to be activated by electron beams from the respective sources to yield different effects.

14. A screen structure as in claim 13 wherein said multiplicity of faces meet in a multiplicity of identical pyramids whose apexes are spaced.

15. A screen structure as in claim 14 wherein said apexes are spaced at distances below the resolving power of the eye and said activated materials yield effects in simulation of natural colors.

16. A screen structure as in claim 13 wherein said screen is thin aluminum.

CHARLES WILLARD GEER.

REFERENCES CITED

The following references are of record in the file of this patent:

UNITED STATES PATENTS

| Number | Name | Date |
|---|---|---|
| 2,029,639 | Schlesinger | Feb. 4, 1936 |
| 2,121,356 | Knoll | June 21, 1938 |
| 2,310,863 | Leverenz | Feb. 9, 1943 |
| 2,431,113 | Glyptis et al. | Nov. 18, 1947 |
| 2,480,848 | Greer | Sept. 6, 1949 |
| 2,481,839 | Goldsmith | Sept. 13, 1949 |
| 2,543,477 | Sziklai et al. | Feb. 27, 1951 |
| 2,544,690 | Koch et al. | Mar. 13, 1951 |

FOREIGN PATENTS

| Number | Country | Date |
|---|---|---|
| 562,168 | Great Britain | June 21, 1944 |
| 866,065 | France | Mar. 31, 1941 |